(12) United States Patent
Yang

(10) Patent No.: US 8,152,031 B2
(45) Date of Patent: Apr. 10, 2012

(54) KETTLE THAT IS OPENED AND CLOSED EASILY AND QUICKLY WITHOUT HAVING TO REMOVE ITS LID

(76) Inventor: Heng-De Yang, Tainan (TW)

( * ) Notice: Subject to any disclaimer, the term of this patent is extended or adjusted under 35 U.S.C. 154(b) by 532 days.

(21) Appl. No.: 12/413,794

(22) Filed: Mar. 30, 2009

(65) Prior Publication Data

US 2010/0243682 A1 Sep. 30, 2010

(51) Int. Cl.
*A47G 19/00* (2006.01)
*A47G 19/14* (2006.01)

(52) U.S. Cl. .................. 222/469; 222/474; 222/475.1

(58) Field of Classification Search .............. 222/469, 222/475.1, 470, 472, 473, 474
See application file for complete search history.

(56) References Cited

U.S. PATENT DOCUMENTS

| 6,427,880 B1 * | 8/2002 | Hirose et al. ............... 222/517 |
| 6,755,120 B1 * | 6/2004 | Lin ............................ 99/323.3 |
| 6,935,536 B2 * | 8/2005 | Tardif ..................... 222/153.14 |
| 6,997,104 B1 * | 2/2006 | Lin ............................ 99/323.3 |

* cited by examiner

*Primary Examiner* — Kevin P Shaver
*Assistant Examiner* — Stephanie E Williams
(74) *Attorney, Agent, or Firm* — Alan Kamrath; Kamrath IP Lawfirm, PA

(57) ABSTRACT

A kettle includes a kettle body, a lid and a handle. The lid includes an inner seat having a connecting hole, an outer seat mounted on the inner seat, a sealing unit movable relative to the inner seat to open or close the connecting hole, a push rod secured to the sealing unit to move the sealing unit, and a drive shaft having a drive plate to move the push rod toward the sealing unit. The handle is connected with the drive shaft to drive and rotate the drive shaft relative to the push rod. Thus, the lid is closed at a normal state to interrupt a connection between the lid and the kettle body, so that the liquid in the kettle body will not flow outwardly from the lid even when the kettle body is inclined or upset.

20 Claims, 7 Drawing Sheets

US 8,152,031 B2

KETTLE THAT IS OPENED AND CLOSED EASILY AND QUICKLY WITHOUT HAVING TO REMOVE ITS LID

BACKGROUND OF THE INVENTION

1. Field of the Invention

The present invention relates to a kettle and, more particularly, to a kettle containing water therein.

2. Description of the Related Art

A conventional kettle 1 in accordance with the prior art shown in FIG. 7 comprises a kettle body 10, a lid 11 mounted on an open upper end of the kettle body 10, and a handle 12 mounted on the kettle body 10. The kettle body 10 has a side provided with a spout 14. However, the liquid contained in the kettle body 10 easily flows outwardly from the spout 14 when the kettle body 10 is inclined or upset. In addition, it is necessary for a user to remove the lid 11 from the kettle body 10 for replenishing the liquid, thereby greatly causing inconvenience to the user.

BRIEF SUMMARY OF THE INVENTION

In accordance with the present invention, there is provided a kettle, comprising a kettle body, a lid mounted on an open upper end of the kettle body, and a handle mounted on the lid. The kettle body has an inner portion provided with a receiving chamber. The open upper end of the kettle body is provided with a reduced support portion for mounting the lid. The lid includes an inner seat mounted on the support portion of the kettle body and having a lower end provided with a connecting hole connected to the receiving chamber of the kettle body, an outer seat mounted on the inner seat, a sealing unit movably mounted on the inner seat and movable relative to the inner seat to open or close the connecting hole of the inner seat, a push rod movably mounted on the inner seat and having a lower end secured to the sealing unit to move the sealing unit relative to the inner seat, and a drive shaft rotatably mounted in the outer seat and having a drive plate abutting an upper end of the push rod to move the push rod toward the sealing unit. The handle is pivotally mounted on the outer seat of the lid and connected with the drive shaft of the lid to drive and rotate the drive shaft of the lid relative to the push rod of the lid.

The primary objective of the present invention is to provide a kettle that is opened and closed easily and quickly without having to remove its lid.

Another objective of the present invention is to provide a kettle, wherein the lid is closed at a normal state to interrupt a connection between the lid and the kettle body, so that the liquid in the receiving chamber of the kettle body will not flow outwardly from the lid even when the kettle body is inclined or upset.

A further objective of the present invention is to provide a kettle, wherein the handle is pulled outwardly relative to the lid to open the lid and to connect the lid to the kettle body, so that the liquid in the receiving chamber of the kettle body can flow through the lid and flow outwardly from the lid.

A further objective of the present invention is to provide a kettle, wherein a user only needs to pull the handle to connect the lid to the kettle body so as to pour or replenish the liquid in the receiving chamber of the kettle body without having to remove the lid from the kettle body, thereby facilitating the user using the kettle.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
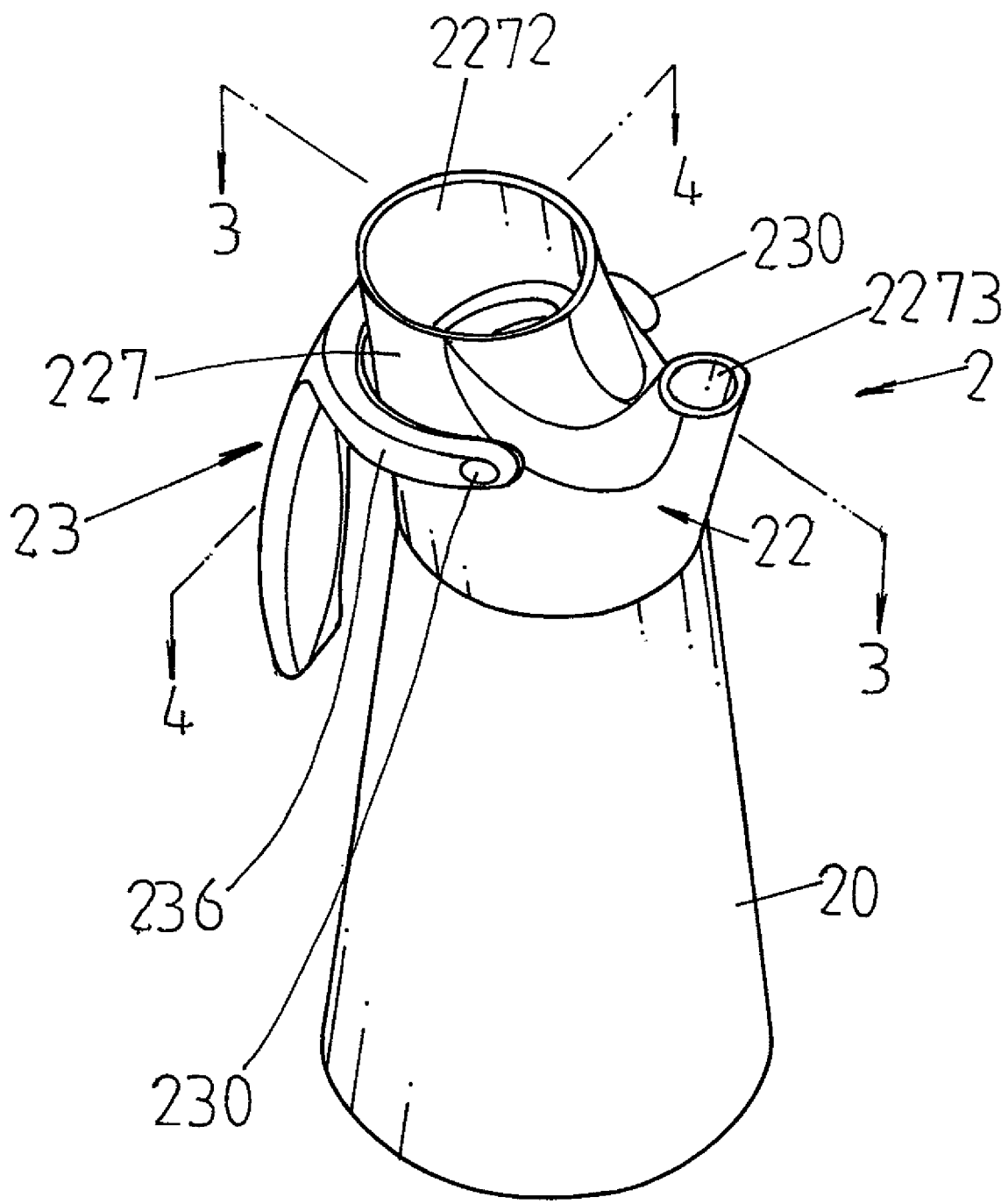
FIG. 1 is a perspective view of a kettle in accordance with the preferred embodiment of the present invention.

Referring to the drawings and initially to FIGS. 1-4, a kettle 2 in accordance with the preferred embodiment of the present invention comprises a kettle body 20, a lid 22 mounted on an open upper end of the kettle body 20, a base 21 mounted on an open lower end 205 of the kettle body 20, and a handle 23 mounted on the lid 22.

The kettle body 20 has an inner portion provided with a receiving chamber 204 containing a liquid, such as water, juice and the like. The open upper end of the kettle body 20 is provided with a reduced support portion 201 for mounting the lid 22.

The base 21 includes a bottom cap 210 inserted into the open lower end 205 of the kettle body 20, and an O-ring 211 is mounted between the bottom cap 210 and the open lower end 205 of the kettle body 20 to provide a sealing effect between the bottom cap 210 and the open lower end 205 of the kettle body 20.

The lid 22 includes an inner seat 220 mounted on the support portion 201 of the kettle body 20 and having a lower end provided with a connecting hole 2204 connected to the receiving chamber 204 of the kettle body 20, an outer seat 227 mounted on the inner seat 220, a sealing unit 222 movably mounted on the inner seat 220 and movable relative to the inner seat 220 to open or close the connecting hole 2204 of the inner seat 220, a push rod 224 movably mounted on the inner seat 220 and having a lower end secured to the sealing unit 222 to move the sealing unit 222 relative to the inner seat 220, a drive shaft 225 rotatably mounted in the outer seat 227 and having a drive plate 2251 abutting an upper end of the push rod 224 to move the push rod 224 toward the sealing unit 222, an elastic member 223 biased between the push rod 224 and the inner seat 220 to move the push rod 224 upward and to move the sealing unit 222 toward the connecting hole 2204 of the inner seat 220, an O-ring 221 mounted between the inner seat 220 and the support portion 201 of the kettle body 20 to provide a sealing effect between the inner seat 220 and the support portion 201 of the kettle body 20, and a rotation piece 226 mounted on the drive shaft 225 to move in concert with the drive shaft 225.

The inner seat 220 of the lid 22 has an inner portion provided with a passage 2206 connected to the connecting hole 2204 of the inner seat 220 and the outer seat 227. The lower end of the inner seat 220 has a central portion provided with a mounting post 2201 which has an inner portion provided with a mounting hole 2202. The mounting post 2201 of the inner seat 220 extends into the passage 2206.

The push rod 224 of the lid 22 is movably mounted in the mounting hole 2202 of the mounting post 2201. The lower end of the push rod 224 protrudes outwardly from the mounting hole 2202 of the mounting post 2201. The upper end of the push rod 224 protrudes outwardly from the mounting hole 2202 of the mounting post 2201 and is movable in the passage 2206 of the inner seat 220. The upper end of the push rod 224 is provided with a recessed driven ramp 2241, and the drive plate 2251 of the drive shaft 225 is pivotally mounted on the driven ramp 2241 of the push rod 224.

The drive shaft 225 of the lid 22 has two opposite ends each provided with a screw bore 2252. The drive shaft 225 of the lid 22 abuts an open top of the inner seat 220.

The elastic member 223 of the lid 22 is mounted on the mounting post 2201 of the inner seat 220 and presses a bottom of the driven ramp 2241 of the push rod 224 to push the driven ramp 2241 of the push rod 224 toward the drive plate 2251 of the drive shaft 225.

The rotation piece 226 of the lid 22 has a bottom provided with an arcuate recess 2261 mounted on a periphery of the drive shaft 225.

Figure 3:
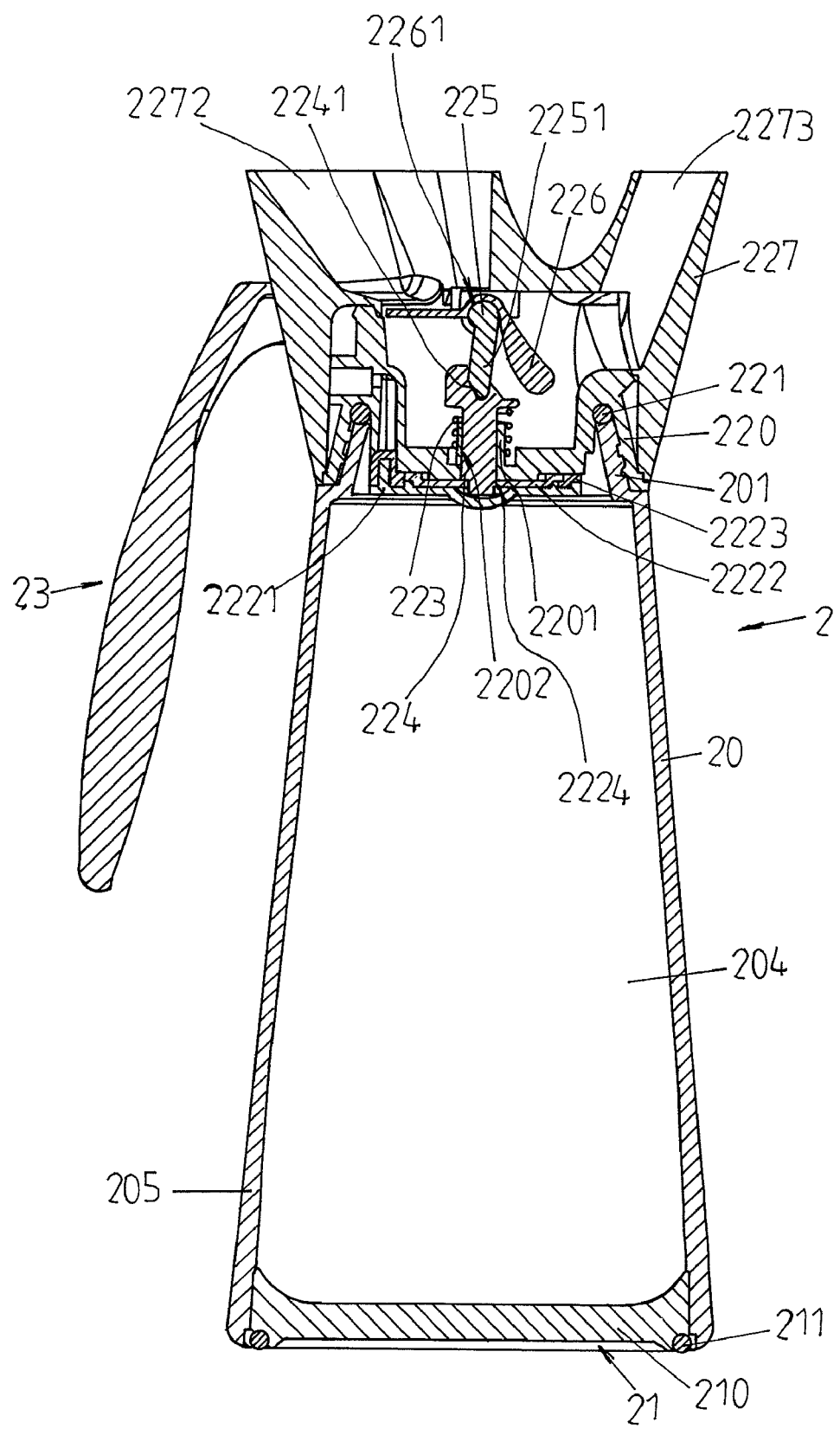
FIG. 3 is a cross-sectional view of the kettle taken along line 3-3 as shown in FIG. 1.
Figure 4:
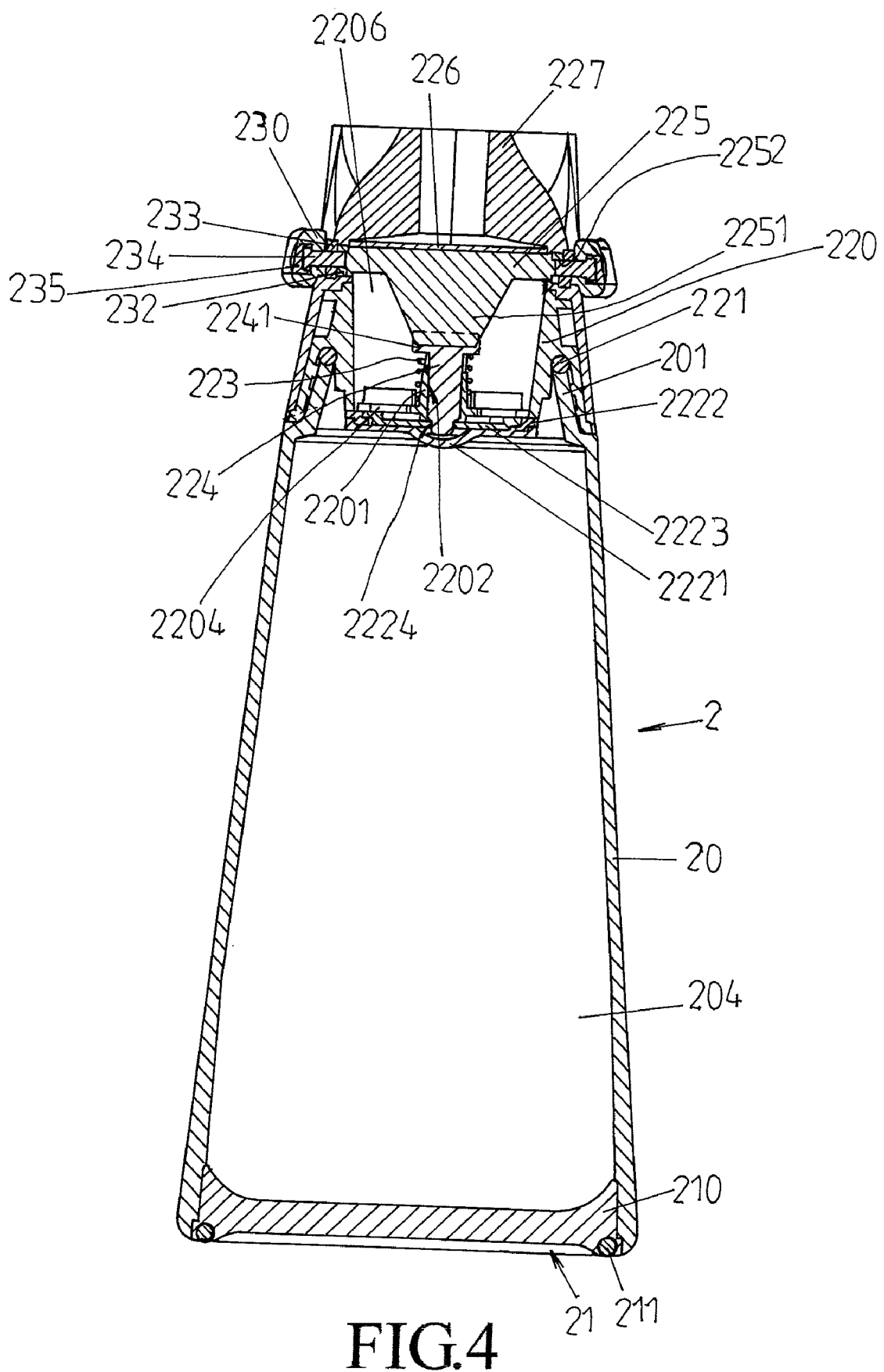
FIG. 4 is a cross-sectional view of the kettle taken along line 4-4 as shown in FIG. 1.
Figure 5:
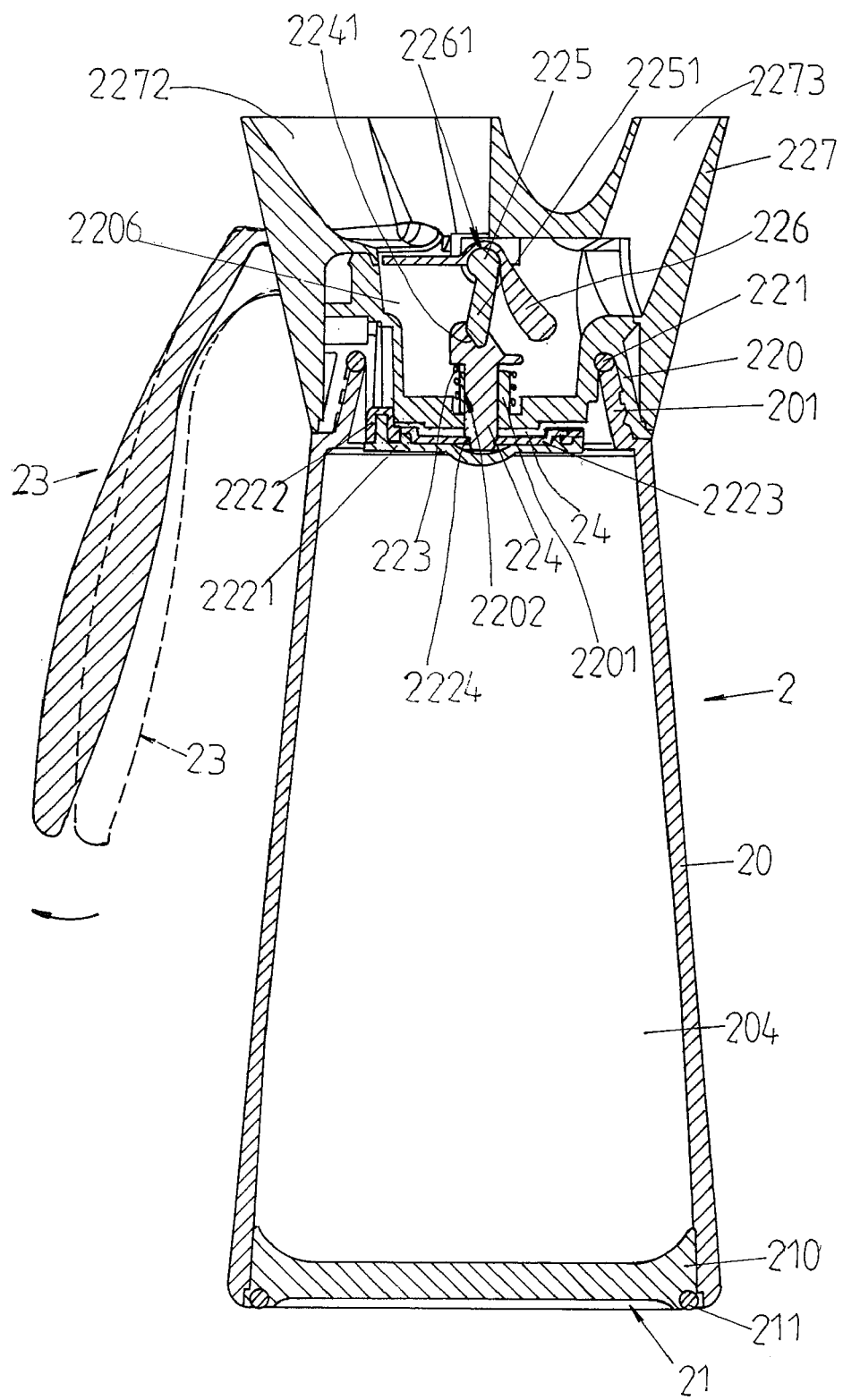
FIG. 5 is a schematic operational view of the kettle as shown in FIG. 3 in use.
Figure 6:
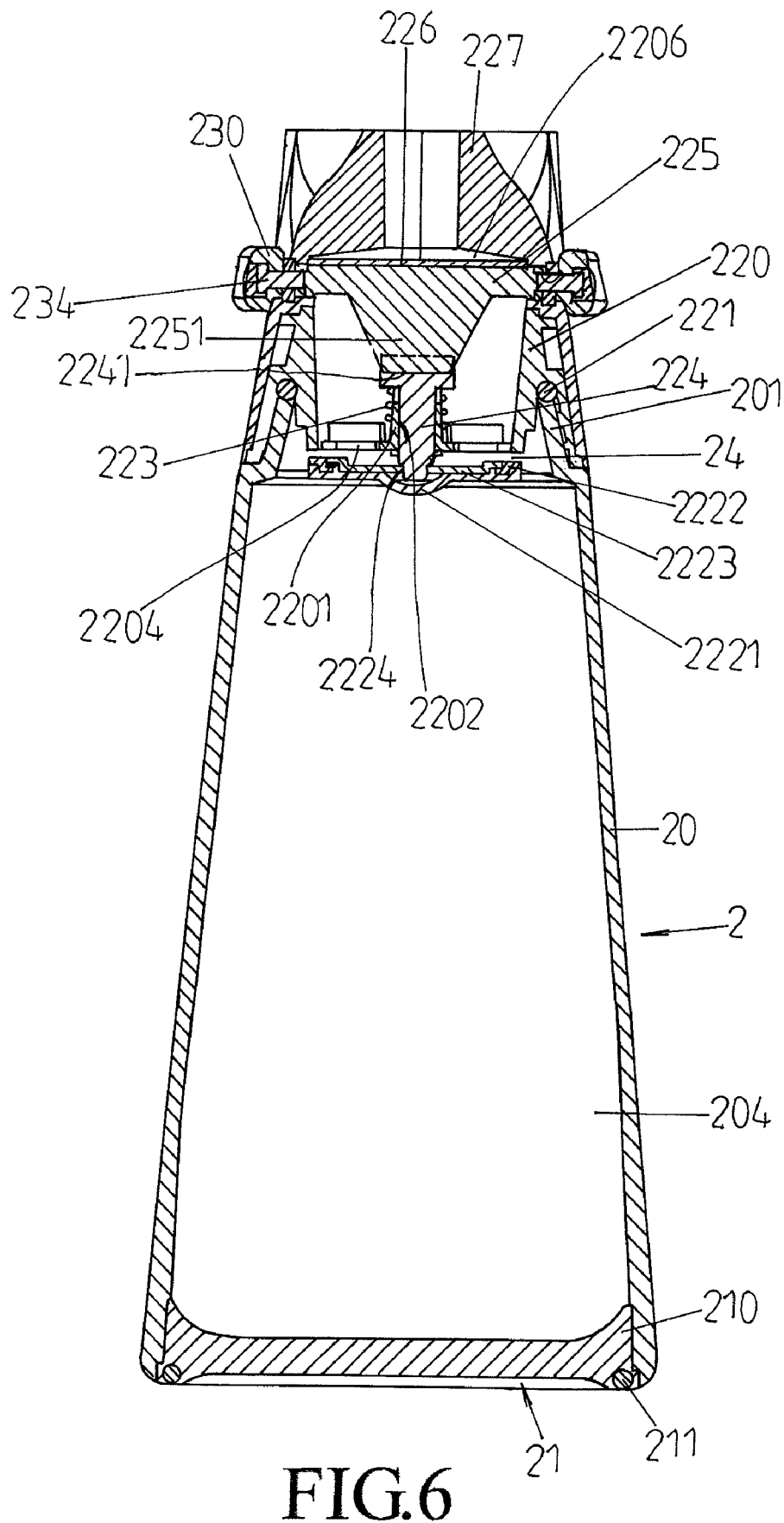
FIG. 6 is a schematic operational view of the kettle as shown in FIG. 4 in use.
Figure 7:
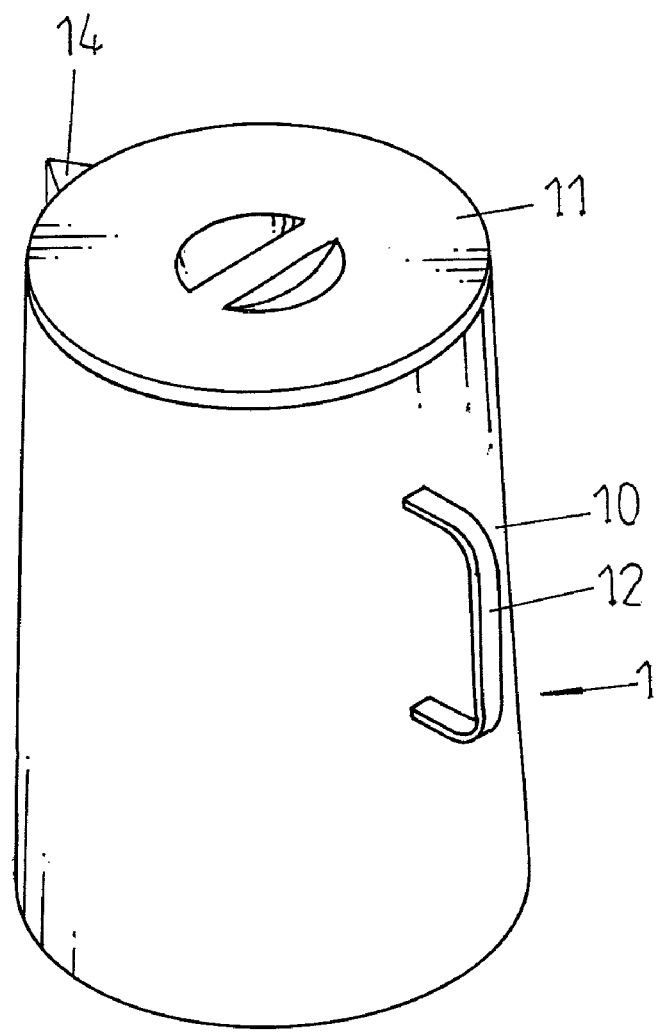
FIG. 7 is a perspective view of a conventional kettle in accordance with the prior art.

The sealing unit 222 of the lid 22 is located outside of the lower end of the inner seat 220. The sealing unit 222 of the lid 22 is movable relative to the inner seat 220 between a first position as shown in FIGS. 3 and 4, where the sealing unit 222 seals the connecting hole 2204 of the inner seat 220 to interrupt a connection between the passage 2206 of the inner seat 220 and the receiving chamber 204 of the kettle body 20, and a second position as shown in FIGS. 5 and 6, where the sealing unit 222 is spaced from the connecting hole 2204 of the inner seat 220 to connect the passage 2206 of the inner seat 220 with the receiving chamber 204 of the kettle body 20 via the connecting hole 2204 of the inner seat 220. Thus, when the sealing unit 222 is spaced from the connecting hole 2204 of the inner seat 220, a gap 24 is defined between the sealing unit 222 and the lower end of the inner seat 220.

The sealing unit 222 of the lid 22 includes an upper disk 2223 secured on and moved with the lower end of the push rod 224 to open or close the connecting hole 2204 of the inner seat 220, a lower disk 2221 mounted on the upper disk 2223, and a washer 2222 located between the upper disk 2223 and the lower disk 2221. The upper disk 2223 of the sealing unit 222 has a central portion provided with a fixing hole 2224, and the lower end of the push rod 224 is secured in the fixing hole 2224 of the upper disk 2223 and stopped by the lower disk 2221.

The outer seat 227 of the lid 22 encompasses the inner seat 220 so that the inner seat 220 of the lid 22 is located between the outer seat 227 of the lid 22 and the support portion 201 of the kettle body 20. The outer seat 227 of the lid 22 has a periphery provided with two opposite through holes 2271 each aligning with the respective screw bore 2252 of the drive shaft 225. The outer seat 227 of the lid 22 has a top provided with an inlet port 2272 connected to the passage 2206 of the inner seat 220 and an outlet port 2273 connected to the passage 2206 of the inner seat 220.

The handle 23 is pivotally mounted on the outer seat 227 of the lid 22 and connected with the drive shaft 225 of the lid 22 to drive and rotate the drive shaft 225 of the lid 22 relative to the push rod 224 of the lid 22. The handle 23 includes a pivot bar 236 pivotally mounted on the outer seat 227 of the lid 22 and having two opposite protruding ears 230 each provided with a through bore 231 aligning with the respective through hole 2271 of the outer seat 227, two locking screws 234 each extending through the respective through bore 231 of the pivot bar 236 and the respective through hole 2271 of the outer seat 227 and each screwed into the respective screw bore 2252 of the drive shaft 225 so that the pivot bar 236 is combined with the drive shaft 225 to drive and rotate the drive shaft 225 of the lid 22 relative to the push rod 224 of the lid 22, two washers 232 each mounted in the respective through hole 2,271 of the outer seat 227 and each located between the respective locking screw 234 and the outer seat 227, two bushings 233 each mounted in the respective through bore 231 of the pivot bar 236 and each located between the respective locking screw 234 and the respective protruding ear 230 of the pivot bar 236, and two end caps 235 each mounted in the respective through bore 231 of the pivot bar 236 and each covering the respective the respective locking screw 234. The pivot bar 236 of the handle 23 is enclosed around the periphery of the outer seat 227.

Figure 2:
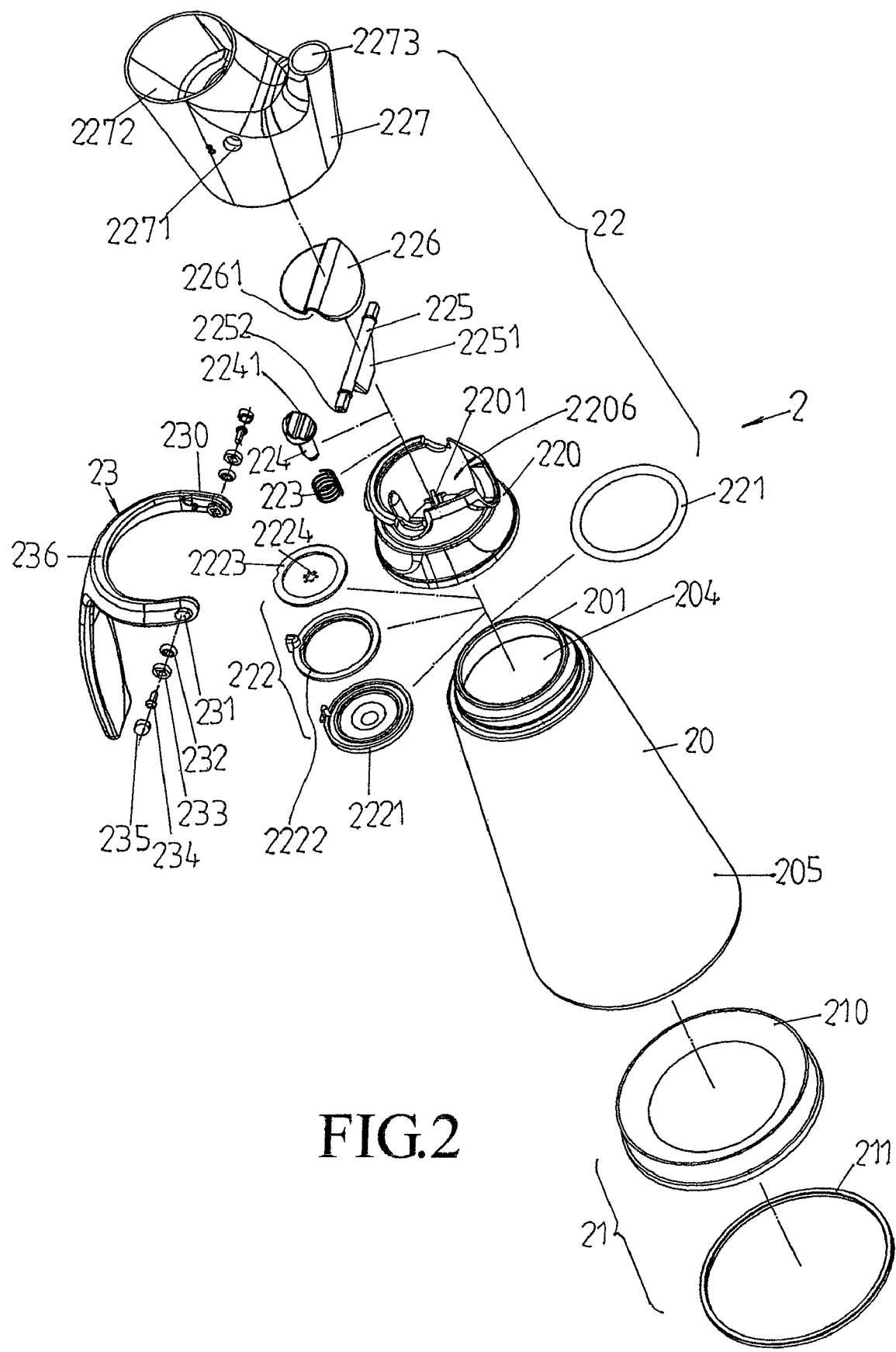
FIG. 2 is an exploded perspective view of the kettle as shown in FIG. 1.

In operation, referring to FIGS. 3-6 with reference to FIGS. 1 and 2, the elastic member 223 of the lid 22 pushes the push rod 224 upward to move the sealing unit 222 toward the connecting hole 2204 of the inner seat 220 so as to close and seal the connecting hole 2204 of the inner seat 220 as shown in FIGS. 3 and 4 and to interrupt the connection between the passage 2206 of the inner seat 220 and the receiving chamber 204 of the kettle body 20, so that the lid 22 is closed, and the liquid in the receiving chamber 204 of the kettle body 20 will not flow outwardly from the lid 22.

On the contrary, when the handle 23 is pivoted outwardly relative to the lid 22, the drive shaft 225 is rotated by the handle 23 to move the drive plate 2251 which presses the driven ramp 2241 of the push rod 224 downward to push the push rod 224 toward the sealing unit 222 and to compress the elastic member 223 of the lid 22, so that the sealing unit 222 is moved downward by the push rod 224 to space from the connecting hole 2204 of the inner seat 220 as shown in FIGS. 5 and 6 so as to connect the passage 2206 of the inner seat 220 with the receiving chamber 204 of the kettle body 20 via the connecting hole 2204 of the inner seat 220. Thus, the liquid in the receiving chamber 204 of the kettle body 20 can in turn flow through the connecting hole 2204 of the inner seat 220 and the passage 2206 of the inner seat 220 into the outer seat 227 of the lid 22 and flow outwardly from the outlet port 2273 of the outer seat 227.

Accordingly, the lid 22 is closed at a normal state to interrupt a connection between the lid 22 and the kettle body 20, so that the liquid in the receiving chamber 204 of the kettle body 20 will not flow outwardly from the lid 22 even when the kettle body 20 is inclined or upset. In addition, the handle 23 is pulled outwardly relative to the lid 22 to open the lid 22 and to connect the lid 22 to the kettle body 20, so that the liquid in the receiving chamber 204 of the kettle body 20 can flow through the lid 22 and flow outwardly from the lid 22. Further, a user only needs to pull the handle 23 to connect the lid 22 to the kettle body 20 so as to pour or replenish the liquid in the receiving chamber 204 of the kettle body 20 without having to remove the lid 22 from the kettle body 20, thereby facilitating the user using the kettle.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A kettle, comprising:
   a kettle body;
   a lid mounted on an open upper end of the kettle body;
   a handle mounted on the lid;
   wherein the kettle body has an inner portion provided with a receiving chamber;
   the open upper end of the kettle body is provided with a reduced support portion for mounting the lid;
   the lid includes:
   an inner seat mounted on the support portion of the kettle body and having a lower end provided with a connecting hole connected to the receiving chamber of the kettle body;
   an outer seat mounted on the inner seat;
   a sealing unit movably mounted on the inner seat and movable relative to the inner seat to open or close the connecting hole of the inner seat;
   a push rod movably mounted on the inner seat and having a lower end secured to the sealing unit to move the sealing unit relative to the inner seat;
   a drive shaft rotatably mounted in the outer seat and having a drive plate abutting an upper end of the push rod to move the push rod toward the sealing unit;
   the handle is pivotally mounted on the outer seat of the lid and connected with the drive shaft of the lid to drive and rotate the drive shaft of the lid relative to the push rod of the lid.

2. The kettle of claim 1, wherein the lid further includes:
   an elastic member biased between the push rod and the inner seat to move the push rod upward and to move the sealing unit toward the connecting hole of the inner seat.

3. The kettle of claim 1, wherein the lid further includes:
   an O-ring mounted between the inner seat and the support portion of the kettle body to provide a sealing effect between the inner seat and the support portion of the kettle body.

4. The kettle of claim 1, wherein the lid further includes:
   a rotation piece mounted on the drive shaft to move in concert with the drive shaft.

5. The kettle of claim 1, wherein
   the lower end of the inner seat has a central portion provided with a mounting post which has an inner portion provided with a mounting hole;
   the push rod of the lid is movably mounted in the mounting hole of the mounting post.

6. The kettle of claim 1, wherein
   the upper end of the push rod is provided with a recessed driven ramp;
   the drive plate of the drive shaft is pivotally mounted on the driven ramp of the push rod.

7. The kettle of claim 1, wherein
   the drive shaft of the lid has two opposite ends each provided with a screw bore;
   the outer seat of the lid has a periphery provided with two opposite through holes each aligning with the respective screw bore of the drive shaft;
   the handle includes:
   a pivot bar pivotally mounted on the outer seat of the lid and having two opposite protruding ears each provided with a through bore aligning with the respective through hole of the outer seat;
   two locking screws each extending through the respective through bore of the pivot bar and the respective through hole of the outer seat and each screwed into the respective screw bore of the drive shaft so that the pivot bar is combined with the drive shaft to drive and rotate the drive shaft of the lid relative to the push rod of the lid.

8. The kettle of claim 7, wherein the handle further includes:
   two washers each mounted in the respective through hole of the outer seat and each located between the respective locking screw and the outer seat;
   two bushings each mounted in the respective through bore of the pivot bar and each located between the respective locking screw and the respective protruding ear of the pivot bar;
   two end caps each mounted in the respective through bore of the pivot bar and each covering the respective the respective locking screw.

9. The kettle of claim 1, wherein the sealing unit of the lid includes:
   an upper disk secured on and moved with the lower end of the push rod to open or close the connecting hole of the inner seat;
   a lower disk mounted on the upper disk;
   a washer located between the upper disk and the lower disk.

10. The kettle of claim 9, wherein
    the upper disk of the sealing unit has a central portion provided with a fixing hole;
    the lower end of the push rod is secured in the fixing hole of the upper disk and stopped by the lower disk.

11. The kettle of claim 1, further comprising:
    a base mounted on an open lower end of the kettle body.

12. The kettle of claim 11, wherein the base includes:
    a bottom cap inserted into the open lower end of the kettle body;
    an O-ring is mounted between the bottom cap and the open lower end of the kettle body to provide a sealing effect between the bottom cap and the open lower end of the kettle body.

13. The kettle of claim 4, wherein the rotation piece of the lid has a bottom provided with an arcuate recess mounted on a periphery of the drive shaft.

14. The kettle of claim 5, wherein
    the inner seat of the lid has an inner portion provided with a passage connected to the connecting hole of the inner seat and the outer seat;
    the sealing unit of the lid is located outside of the lower end of the inner seat;
    the sealing unit of the lid is movable relative to the inner seat between a first position where the sealing unit seals the connecting hole of the inner seat to interrupt a connection between the passage of the inner seat and the receiving chamber of the kettle body, and a second position where the sealing unit is spaced from the connecting hole of the inner seat to connect the passage of the inner seat with the receiving chamber of the kettle body via the connecting hole of the inner seat;
    when the sealing unit is spaced from the connecting hole of the inner seat, a gap is defined between the sealing unit and the lower end of the inner seat.

15. The kettle of claim 2, wherein the elastic member of the lid is mounted on the mounting post of the inner seat and presses a bottom of the driven ramp of the push rod to push the driven ramp of the push rod toward the drive plate of the drive shaft.

16. The kettle of claim 1, wherein
    the outer seat of the lid encompasses the inner seat;
    the inner seat of the lid is located between the outer seat of the lid and the support portion of the kettle body.

17. The kettle of claim 14, wherein
the outer seat of the lid has a top provided with an inlet port connected to the passage of the inner seat and an outlet port connected to the passage of the inner seat;
the mounting post of the inner seat extends into the passage.

18. The kettle of claim 14, wherein
the lower end of the push rod protrudes outwardly from the mounting hole of the mounting post;
the upper end of the push rod protrudes outwardly from the mounting hole of the mounting post and is movable in the passage of the inner seat.

19. The kettle of claim 1, wherein the pivot bar of the handle is enclosed around the periphery of the outer seat.

20. The kettle of claim 1, wherein the drive shaft of the lid abuts an open top of the inner seat.

* * * * *